United States Patent
Kuns et al.

(10) Patent No.: US 8,411,840 B2
(45) Date of Patent: Apr. 2, 2013

(54) METHOD OF UNIFYING CONTROL OF CONTACT CENTER SYSTEM

(75) Inventors: Edward Kuns, Glen Ellyn, IL (US); Biswajeet Mukherjee, Palatine, IL (US); Robert Owens, Franklin, TN (US)

(73) Assignee: Aspect Software Inc., Chelmford, MA (US)

( * ) Notice: Subject to any disclaimer, the term of this patent is extended or adjusted under 35 U.S.C. 154(b) by 989 days.

(21) Appl. No.: 12/356,664

(22) Filed: Jan. 21, 2009

(65) Prior Publication Data
US 2010/0008492 A1 Jan. 14, 2010

Related U.S. Application Data

(60) Provisional application No. 61/022,426, filed on Jan. 21, 2008.

(51) Int. Cl.
*H04M 3/00* (2006.01)
(52) U.S. Cl. ............. 379/265.02; 379/201.05; 709/220; 709/223
(58) Field of Classification Search ............. 379/265.02, 379/265.03, 201.01, 201.03, 201.05, 219, 379/220.01; 709/220, 221, 223, 224, 238, 709/244, 248; 700/11, 17, 18
See application file for complete search history.

(56) References Cited

U.S. PATENT DOCUMENTS

| | | | | |
|---|---|---|---|---|
| 6,233,561 | B1 * | 5/2001 | Junqua et al. | 704/277 |
| 2001/0055372 | A1 * | 12/2001 | Glowny et al. | 379/88.22 |
| 2007/0036331 | A1 * | 2/2007 | Fitzgerald | 379/265.02 |

* cited by examiner

*Primary Examiner* — Quynh H Nguyen
*Assistant Examiner* — Oleg Asanbayev
(74) *Attorney, Agent, or Firm* — Husch Blackwell LLP

(57) ABSTRACT

A method and apparatus are provided for changing operating parameters within an automatic contact distribution system that includes a plurality of functionally similar but structurally different automatic contact distributor subsystems. The method includes the steps of a user selecting an operating parameter for use by each of the plurality of functionally similar but structurally different automatic contact distributor subsystems, a respective conversion program for each of the plurality of functionally similar but structurally different automatic contact distributor subsystems receiving the selected operating parameter from the user and incorporating the selected operating parameter into the respective subsystems.

22 Claims, 1 Drawing Sheet

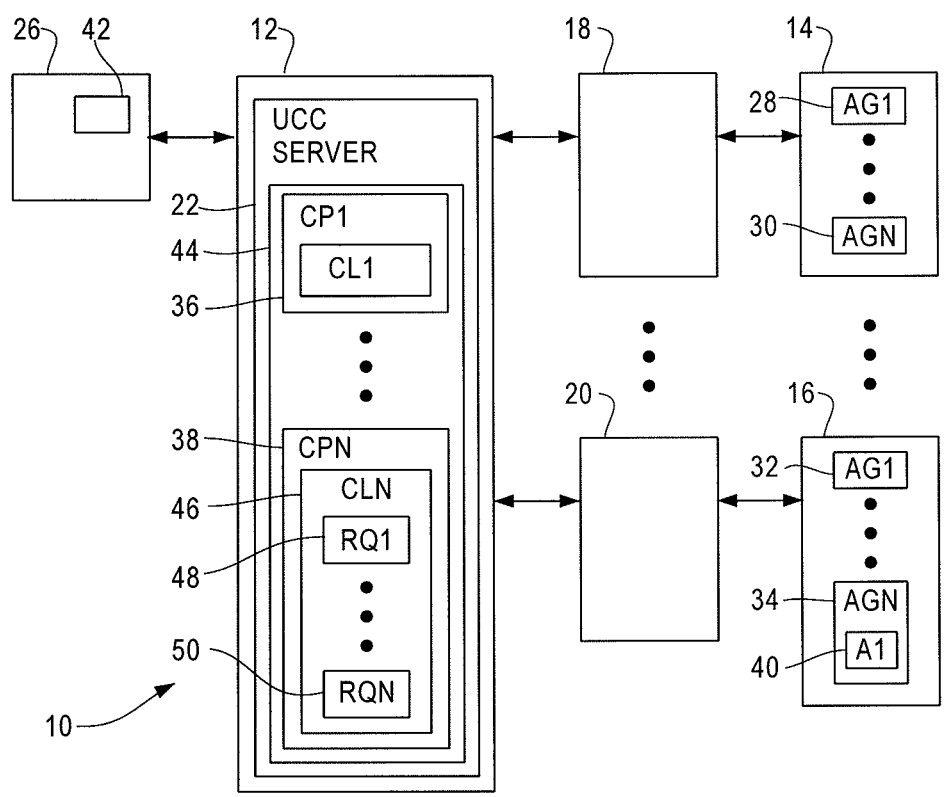

METHOD OF UNIFYING CONTROL OF CONTACT CENTER SYSTEM

FIELD OF THE INVENTION

The field of the invention relates to computer systems and more particularly to interconnected computer systems.

BACKGROUND OF THE INVENTION

The difficulty of providing configuration and login access to users within interconnected computer systems is generally known. One or more interconnected computers are typically required whenever the task is too large for a single computer or where specific tasks are provided by different independent systems and the activities of the systems must be coordinated.

Automatic call distributors (ACDs) are an example of such a situation. ACDs are typically used by telemarketers and/or service providers to make and receive calls. ACDs are also typically provided with one or more host computers that controls call processing.

Workforce management, and performance optimization systems (operating within an ACD or otherwise) are examples of the different tasks that may operate within a single host or be distributed over a number of hosts. In addition to making and receiving calls, the host of an ACD may also act as a repository of customer records.

In order to reduce telephone costs, telemarketers often locate a number of ACDs of an ACD system near major metropolitan areas. However, during periods of overload, it may be convenient to handle calls through any ACD of the ACD system. As a result, the host or hosts of each ACD must be accessible from any agent station throughout the system in order to provide convenient access to customer records.

While interconnection of hosts for the retrieval of customer records works relatively well, it is often difficult to coordinate the activities of the ACDs themselves. In some cases, the ACDs of an ACD system may include different models from the same manufacturer. In other cases, the ACDs may be provided by different manufacturers.

In many cases, coordination of ACDs requires the use of custom interfaces that allow the exchange of information among ACDs. However, the use of custom interfaces is time consuming and require constant attention. In some situations, coordination of ACDs cannot be done without screen scraping the native command and control interface for the ACDs. Accordingly, a need exists for better methods of interacting with ACDs.

SUMMARY

A method and apparatus are provided for changing operating parameters within an automatic contact distribution system that includes a plurality of functionally similar but structurally different automatic contact distributor subsystems. The method includes the steps of a user selecting an operating parameter for use by each of the plurality of functionally similar but structurally different automatic contact distributor subsystems, a respective conversion program for each of the plurality of functionally similar but structurally different automatic contact distributor subsystems receiving the selected operating parameter from the user and incorporating the selected operating parameter into the respective subsystems.

BRIEF DESCRIPTION OF THE DRAWINGS

FIG. 1 is a block diagram of an automatic contact distribution system shown generally in accordance with an illustrated embodiment of the invention.

DETAILED DESCRIPTION OF AN ILLUSTRATED EMBODIMENT

FIG. 1 is a block diagram of an automatic contact distribution system 10 that provides unified control of a number of dissimilar automatic contact distribution subsystems shown generally in accordance with an illustrated embodiment of the invention. The automatic contact distribution system 10 may be used by any of a number of different organizations (e.g., political, environmental, commercial) to handle interactions with clients.

As used herein, dissimilar automatic contact distributions are automatic contact distributors that provide substantially the same functionality based upon the use of different methods and/or hardware. Dissimilar automatic contact distributors may be made by the same or by different manufacturers (e.g., a Rockwell Spectrum automatic contact distributor, an Aspect call center, etc.).

The automatic contact distribution system 10 may have at least one host 12 that provides a unified command and control to the system 10. Connected to the host 12 may be one or more dissimilar automatic call or contact distributors (ACDs) 14, 16. Each ACD 14, 16 may include a workforce management server, a call tracking server, a reporting server and/or quality management server. The ACDs 14, 16 may be coupled to the host 12 through a respective terminal adapter (TA) 18, 20.

The ACDs 14, 16 may be legacy systems or newer automatic contact distributors. In the case where the ACDs 14, 16 are a mix of conventional and legacy systems, a respective terminal adapter 18, 20 may be used to adapt the instruction sets and protocols of the ACDs 14, 16 to the host 12.

The host 12 may include one or more command and control servers 22. The servers 22 may be accessed by a supervisor working through a desktop 26 (the supervisor and desktop 26 together hereinafter sometimes referred to as the supervisor 26) operating on a PC connected to the host 12.

The host 12 and servers 22 may be used to provide administrative and control support for enhanced use of the ACDs 14, 16. For example, the ACDs 14, 16 may be located in remote geographic areas and process contacts (calls) with clients through a local connection to one or more communication systems (e.g., the PSTN, the Internet, etc.). As the calls are processed by the ACDs 14, 16, a supervisor 26 may monitor a call loading of the ACDs 14, 16. By being able to monitor a loading of each ACD 14, 16, the supervisor may adjust the number of agents available for each call type and even the routing of calls among the ACDs 14, 16.

Turning now to the system 10, in specific, each of the ACDs 14, 16 may include one or more agent groups 28, 30, 32, 34. Each agent group 28, 30, 32, 34 may be assigned to handling a particular type of contact.

For example, in the case of an environmental organization, the organization may promulgate a number of different telephone numbers and/or e-mail addresses for contacting the organization through the automatic contact distribution system 10. Each different telephone number and/or e-mail addresses promulgated by the organization may be reserved for a particular use (e.g., different environmental issues). In order to ensure that a qualified agent is assigned to each call, the organization may associate one or more agent groups with each telephone and/or e-mail address and require each agent assigned to a group have a certain predefined set of skills.

In operation, a supervisor working through the desktop 26 may monitor the loading of each call group 28, 30, 32, 34. As is known, the quantity and composition of contacts processed by the system 10 may change on a daily and even on an hourly basis.

The supervisor 26 may monitor the loading of each agent group using various monitoring features operating within the ACDs 14, 16 and server 22. As the supervisor 26 monitors the operation of the ACDs 14, 16, the supervisor 26 may choose to change the operating parameters of the ACDs 14, 16 in order to balance the loading among the agent groups or to otherwise improve the efficiency of the system 10. For example, the supervisor 26 may change the call processing capacity of each agent group by transferring agents among agent groups or among ACDs 14, 16.

Where ACDs 14, 16 are functionally equivalent but operationally different, then a set of conversion programs 36, 38 are provided to adapt the changes in the parameters to the data models of the processing devices of the different types of ACDs 14, 16. For example, if the supervisor 26 should choose to transfer agents among ACDs 14, 16, then the supervisor 26 would enter an identifier of the agent 40, an identifier of a source ACD 16 and an identifier of a destination ACD 14.

In order to change the parameters of the ACDs 14, 16, the supervisor 26 may activate a control program 44 within the server 22 that in turn downloads a control user client 42 to the supervisor 26. The supervisor may enter the identifier of the agent 40, the identifier of the source ACD 16 and the destination ACDs 14 and activate a transfer softkey. In response, the control program 44 may send an agent add instruction to the conversion program 36 of the destination ACD 14 and an agent remove instruction to the conversion program 38 of the source ACD 16.

In response, the conversion programs 36, 38 may prepare to add the agent 40 to the destination ACD 14 and remove the agent 40 from the source ACD 16. As a first step in the agent transfer, the conversion programs may retrieve a requirements list 48, 50 for each ACD 14, 16. For example, if the source ACD 16 were an Aspect call center, then the requirements list 48, 50 may simply require an identifier of the agent in order to remove the agent from the source ACD 16. On the other hand, if the destination ACD 14 were a Spectrum ACD, then the requirements list would indicate that a physical location of the agent 40 must also be provided to the destination ACD 14 in order to add the agent 40.

Upon retrieving the requirements list 48, 50, the conversion programs 36, 38 may compare the information provided by the supervisor 26 with the required information identified within the requirements list 48, 50. If the data formats for the two devices 14 and 16 differ, the conversion program 36, 38 will perform data conversion and may notify the supervisor 26 of the need to approve the transformation. For example, some ACDs store an agent's name as an international character capable first name, last name, middle name; while other ACDs may store an agent's name as a single fixed-length US ASCII string, or may even only save a name as all-uppercase US ASCII characters. Where possible, the conversion programs 36, 38 will perform data conversion without requiring supervisor 26 input. If there are any deficiencies, then the conversion program 36, 38 may search for the information and if the conversion program 36, 38 can't find the information, then notify the supervisor 26 who may then manually enter any missing information. In the case of the transferred agent 40, the conversion program 36 may simply send a query to the source ACD 16 requesting that the location of the agent 40 be provided. In response, the source ACD 16 may provide the location of the agent 40 and the conversion program 36 may proceed to add the agent 40 to the destination ACD 14.

In another embodiment, the control client 42 may allow the bulk copying of configuration data between ACDs 14, 16. For example, agent data may be copied from a first ACD (e.g., ACD 14) to a second ACD (e.g., ACD 16) to allow calls arriving at the second ACD 16 to be assigned to agents located at the first ACD 14. Configuration data may include agent skills, agent preferences regarding how contacts arrive, screen set up data for each agent etc.

Alternatively, configuration data may include contact routing data or even reporting data. Regarding contact routing data, for example, the destination identifier of a contact may be used as an initial identifier of a purpose of a call and may be used in conjunction with a source identifier to determine how a contact is to be handled.

In this case, the supervisor 26 may select an ACD (e.g., ACD 14), identify a type of configuration data and activate a copy softkey on the client 42. In response, the conversion program 38 may retrieve a requirements list 48, 50 that identifies each information element associated with the type of configuration data. The requirements list 48, 50 may also include a conversion factor that converts each item of configuration data into a form that can be processed by the program 38. As above, the requirements list 48, 50 may also identify any missing configuration data that may be used by the ACD 14, but that may not be used by another ACD (e.g., ACD 16). The program 44 may search a database for any missing configuration data or prompt the supervisor 26 for the data if the data cannot be found.

In another embodiment, multiple entities can be selected and operated upon as one group. For example, the supervisor 26 may select a number of ACDs 14, 16 and change one or more properties. More specifically, the supervisor 26 may change a set of parameters that cause transfers of contacts among ACDs 14, 16 during short periods of overload. This may be useful in cases where ACDs are located in the same time zone to avoid overloads associated with particular times of the day (e.g., 12 noon local time). In this case, the supervisor may reduce a threshold value associated with transfer of telephone calls held in a call queue in order to more quickly cause transfers among ACDs 14, 16. For example, if a first group of agents (e.g., agent group 28) located at a first ACD 14 and time zone handles contacts of type 1 and a second group of agents (e.g., agent group 32) located at a second ACD 16 and time zone handles calls of the same type, then the supervisor 26 may reduce the threshold time in queue to reduce overloads during those time periods.

As above, the supervisor 26 may select the queue transfer threshold value in the control client 42. The supervisor 26 may select the ACDs 14, 16 in which a time value change is appropriate and enter a time value through the control client 42. The program 44 may accept the time value and send a change message to the conversion programs 36, 38. The conversion programs 36, 38 may retrieve a set of requirements 48, 50 for the respective ACDs 14, 16. If the requirements entered through the control client 42 are different than the time base contained in the list of requirements 48, 50, then the respective conversion programs 36, 38 may convert the time scale and enter the threshold value of the change within the respective ACDs 14, 16.

As another example, the supervisor 26 may choose to change a criteria for defining call types. In this case, the supervisor 26 may select one or more ACDs 14, 16 and the call type. The client 42 may display one or more criteria that defines the call type. The supervisor 26 may change some or all of the existing criteria and activate an apply criteria softkey. The program 44 may retrieve a requirements list 48, 50 and convert any entered or changed criteria to a format required by the respective ACDs 14, 16. The entered criteria are compared with the requirements list 48, 50. If there are any deficiencies, the control program 44 searches for the missing information element or prompts the supervisor 26 for the missing element.

In another embodiment, the control program 44 may programmed to schedule changes for a specific time. In this case, the supervisor 26 may activate a schedule softkey to enter a time of the parameter change.

In another embodiment, the control program 14 may audit the ACDs 14, 16 for the proper entry of changes. If an ACD 14, 16 is out of operation during a scheduled or non-scheduled change, then the control program 44 continues to periodically instruct the conversion programs 36, 38 to execute any incomplete changes. When the ACD 14, 16 resumes normal operation, the conversion program 36, 38 detects return to normal operation and executes entry of the change.

In another embodiment, the control program 14 may perform a bulk copy of existing configuration data and save the copy into memory along with a time and date of the copy and an identifier of the ACD 14, 16. The saving of configuration data provides an audit trail of changes and allows rollback of changes in the event of a malfunction or other event requiring resumption of a prior configuration.

In another embodiment, a single new agent (or agent group or route or route list, etc) may be added to multiple systems simultaneously. For example, 100 new agents are hired and need to be added to each of seven disparate contact centers. Rather than manually adding each new agent to each system individually (thereby requiring 700 edits), this embodiment will allow for entering the information for each agent one time, with the conversion program 36, 38 aiding the supervisor 26 in this process, so each type of information has to be entered ideally only one time and (at worst) one time per unconvertible data model, which is much simpler than having to enter this information one time per disparate system.

A specific embodiment of method and apparatus for securing accessing a computer system during startup has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of changing operating parameters within an automatic contact distribution system that includes a plurality of functionally similar but structurally different automatic contact distributor subsystems which provide substantially the same functionality using different hardware components comprising:

a user selecting an operating parameter for use by each of the plurality of functionally similar but structurally different automatic contact distributor subsystems comprising one or more processors in communication with one or more memory devices;

defining a set of structural changes for each subsystem associated with each selected operating parameter and comparing the set of structural changes with an information content of an entered functional change;

a respective conversion program for each of the plurality of functionally similar but structurally different automatic contact distributor subsystems, each of the respective conversion programs receiving the selected operating parameter from the user, retrieving a requirements list and comparing the selected operating parameter to the requirements list to determine conversion requirements;

each of the respective conversion programs identifying missing information using the requirements list, searching a set of databases for the missing information, and prompting the user for the missing information if the missing information is not found by the searching and prompting the user for approval if there are any automatically converted fields; and incorporating the selected operating parameter into the respective subsystems in accordance with the conversion requirements.

2. The method of changing operating parameters as in claim 1 further comprising providing a user interface for entry of functional changes by the user.

3. The method of changing operating parameters as in claim 1 further comprising automatically translating data models from one software device to another.

4. The method of changing operating parameters as in claim 1 wherein the selected operating parameter further comprises a group assignment of an agent or an ACD assignment.

5. The method of changing operating parameters as in claim 1 further comprising copying configuration data from a first subsystem of the plurality of subsystems.

6. The method of changing operating parameters as in claim 1 further comprising automatically adding configuration data of a single agent to a plurality of ACDs.

7. The method of changing operating parameters as in claim 1 further comprising the conversion program detecting return to normal operation of an out of operation automatic contact distribution subsystem and executing any incomplete operating parameter change in response to detection of return to normal operation.

8. The method of changing operating parameters as in claim 5 further comprising saving the copied configuration data into a database as a portion of an audit trail.

9. An apparatus for changing operating parameters within an automatic contact distribution system that includes a plurality of functionally similar but structurally different automatic contact distributor subsystems which provide substantially the same functionality using different hardware components comprising:

means for selecting by a user an operating parameter for use by each of the plurality of functionally similar but structurally different automatic contact distributor subsystems;

means for defining a set of structural changes for each subsystem associated with each selected operating parameter and comparing the set of structural changes with an information content of an entered functional change;

means within a respective conversion program for each of the plurality of functionally similar but structurally different automatic contact distributor subsystems for receiving the selected operating parameter from the user, retrieving a requirements list and comparing the selected operating parameter to the requirements list to determine conversion requirements;

means for identifying missing information using the requirements list, searching a set of databases for the missing information and prompting the user for the missing information if the missing information is not found by the searching and approval if there are any automatically converted fields; and incorporating the selected operating parameter into the respective subsystems in accordance with the conversion requirements.

10. The apparatus for changing operating parameters as in claim 9 further comprising means for providing a user interface for entry of functional changes by the user.

11. The apparatus for changing operating parameters as in claim 9 further comprising means for automatically translating data models from one device to another.

12. The apparatus for changing operating parameters as in claim 9 wherein the selected operating parameter further comprises a group assignment of an agent or an ACD assignment.

13. The apparatus for changing operating parameters as in claim 9 further comprising means for copying configuration data from a first subsystem of the plurality of subsystems.

14. The apparatus for changing operating parameters as in claim 13 further comprising means for saving the copied configuration data into a second subsystem of the plurality of subsystems.

15. The apparatus for changing operating parameters as in claim 13 further comprising means for saving the copied configuration data into a database as a portion of an audit trail.

16. An apparatus for changing operating parameters within an automatic contact distribution system that includes a plurality of functionally similar but structurally different automatic contact distributor subsystems which provide substantially the same functionality using different hardware components comprising:

one or more processors in communication with one or more memory devices;

control client stored in at least one of the one or more memory devices such that execution by at least one of one or more processors allows selection by a user of an operating parameter for use by each of the plurality of functionally similar but structurally different automatic contact distributor subsystems;

a set of structural changes defined for each subsystem associated with each selected operating parameter and comparing the set of structural changes with an information content of an entered functional change; and a respective conversion program for each of the plurality of functionally similar but structurally different automatic contact distributor subsystems that receives the selected operating parameter, that retrieves a requirements list and compares the selected operating parameter to the requirements list to determine conversion requirements, that identifies missing information using the requirements list, searches a set of databases for the missing information, and prompts the user for the missing information if the missing information is not found by the searching and for approval if there are any automatically converted fields; and that incorporates the selected operating parameter into the respective subsystems in accordance with the conversion requirements.

17. The apparatus for changing operating parameters as in claim 16 further comprising a user interface that allows entry of functional changes by the user.

18. The apparatus for changing operating parameters as in claim 16 further comprising a set of databases that is searched for any missing information.

19. The apparatus for changing operating parameters as in claim 16 wherein the selected operating parameter further comprises a group assignment of an agent.

20. The apparatus for changing operating parameters as in claim 16 further comprising configuration data copied from a first subsystem of the plurality of subsystems.

21. The apparatus for changing operating parameters as in claim 20 further comprising saving the copied configuration data into a second subsystem of the plurality of subsystems.

22. The apparatus for changing operating parameters as in claim 21 further comprising saving the copied configuration data into a database as a portion of an audit trail.

* * * * *